US010748443B2

(12) United States Patent
Koniki et al.

(10) Patent No.: US 10,748,443 B2
(45) Date of Patent: Aug. 18, 2020

(54) APPARATUS AND METHOD FOR VISUAL-ASSISTED TRAINING, COLLABORATION, AND MONITORING IN AUGMENTED/VIRTUAL REALITY IN INDUSTRIAL AUTOMATION SYSTEMS AND OTHER SYSTEMS

(71) Applicant: Honeywell International Inc., Morris Plains, NJ (US)

(72) Inventors: Ramesh Babu Koniki, Bangalore (IN); Subhan Basha Dudekula, Bangalore (IN); Arif Shuail Ahamed, Bangalore (IN); Manas Dutta, Bangalore (IN); Mark Phillips, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 31 days.

(21) Appl. No.: 15/941,327

(22) Filed: Mar. 30, 2018

(65) Prior Publication Data

US 2018/0357823 A1 Dec. 13, 2018

Related U.S. Application Data

(60) Provisional application No. 62/517,006, filed on Jun. 8, 2017, provisional application No. 62/517,015, filed (Continued)

(51) Int. Cl.
*G09B 19/00* (2006.01)
*G06F 16/13* (2019.01)
(Continued)

(52) U.S. Cl.
CPC ............ *G09B 19/003* (2013.01); *G06F 3/011* (2013.01); *G06F 3/017* (2013.01); *G06F 3/033* (2013.01);
(Continued)

(58) Field of Classification Search
CPC ....... G06T 19/006; G06F 3/017; G06F 3/033; G06F 3/167; G06F 3/011; G06F 16/116;
(Continued)

(56) References Cited

U.S. PATENT DOCUMENTS 5,751,289 A 5/1998 Myers
6,356,437 B1 3/2002 Mitchell et al.
(Continued)

FOREIGN PATENT DOCUMENTS

CN 102136204 A 7/2011
CN 102881202 A 1/2013
(Continued)

OTHER PUBLICATIONS

David Ross et al., U.S. Appl. No. 62/501,744 (Year: 2017).*
(Continued)

*Primary Examiner* — Chante E Harrison (57) ABSTRACT

A method includes receiving first data defining first user actions associated with a first augmented reality/virtual reality (AR/VR) space. The method also includes translating the first user actions into first commands associated with first visual objects in the first AR/VR space. The method further includes aggregating the first commands into at least one first record and transmitting the at least one first record. The method also includes receiving at least one second record containing second commands associated with second visual objects in a second AR/VR space. The method further includes translating the second commands into second user actions. In addition, the method includes creating or causing a user device to create a replica of the second AR/VR space based on the second user actions.

20 Claims, 7 Drawing Sheets

Related U.S. Application Data on Jun. 8, 2017, provisional application No. 62/517,037, filed on Jun. 8, 2017.

(51) Int. Cl.

| | | |
|---|---|---|
| *G06F 16/11* | (2019.01) | |
| *G06F 3/033* | (2013.01) | |
| *G06T 19/00* | (2011.01) | |
| *G09B 9/00* | (2006.01) | |
| *G06F 3/01* | (2006.01) | |
| *G06Q 10/10* | (2012.01) | |
| *G09B 5/02* | (2006.01) | |
| *H04L 29/06* | (2006.01) | |
| *G06F 3/16* | (2006.01) | |
| *H04L 29/08* | (2006.01) | |
| *G09B 7/02* | (2006.01) | |

(52) U.S. Cl.
CPC ............ *G06F 3/167* (2013.01); *G06F 16/116* (2019.01); *G06F 16/13* (2019.01); *G06Q 10/1053* (2013.01); *G06T 19/006* (2013.01); *G09B 5/02* (2013.01); *H04L 67/38* (2013.01); *G06F 3/014* (2013.01); *G09B 7/02* (2013.01); *G09B 9/00* (2013.01); *H04L 67/22* (2013.01)

(58) Field of Classification Search
CPC ......... G06F 16/13; G09B 19/003; G09B 9/00; G09B 5/02; G06Q 10/1053; H04L 67/38; H04L 67/22
See application file for complete search history.

(56) References Cited

U.S. PATENT DOCUMENTS

| | | | |
|---|---|---|---|
| 6,718,215 B2 | 4/2004 | Friedrich et al. | |
| 7,103,506 B2 | 9/2006 | Friedrich et al. | |
| 7,162,385 B2 | 1/2007 | Scharold et al. | |
| 7,203,560 B1 | 4/2007 | Wylie et al. | |
| 7,372,451 B2 | 5/2008 | Dempski | |
| 7,714,895 B2 | 5/2010 | Pretlove et al. | |
| 8,046,719 B2 | 10/2011 | Skourup et al. | |
| 8,055,375 B2 | 11/2011 | Pingel et al. | |
| 8,332,193 B2 | 12/2012 | McKim et al. | |
| 8,373,618 B2 | 2/2013 | Friedrich et al. | |
| 8,390,534 B2 | 3/2013 | Hamadou et al. | |
| 8,594,814 B2 | 11/2013 | Rovaglio et al. | |
| 9,323,055 B2 | 4/2016 | Baillot | |
| 9,324,229 B2 | 4/2016 | Baillot | |
| 9,384,675 B2 | 7/2016 | Zboray et al. | |
| 9,400,495 B2 | 7/2016 | Michalscheck et al. | |
| 9,400,993 B2 | 7/2016 | Edwards | |
| 9,418,484 B2 | 8/2016 | Chiu et al. | |
| 9,438,648 B2 | 9/2016 | Asenjo et al. | |
| 9,472,119 B2 | 10/2016 | Selvaraj | |
| 9,473,758 B1 | 10/2016 | Long et al. | |
| 9,489,832 B2 | 11/2016 | Nair et al. | |
| 9,529,348 B2 | 12/2016 | Kephart et al. | |
| 9,529,424 B2 | 12/2016 | Hilliges et al. | |
| 9,573,062 B1 | 2/2017 | Long et al. | |
| 9,576,329 B2 | 2/2017 | Frankel et al. | |
| 9,767,613 B1* | 9/2017 | Bedikian ............... | G06T 19/006 |
| 2003/0214533 A1 | 11/2003 | Cull et al. | |
| 2007/0048702 A1 | 3/2007 | Jang et al. | |
| 2008/0077370 A1 | 3/2008 | Frick | |
| 2014/0004487 A1 | 1/2014 | Cheben et al. | |
| 2014/0320529 A1* | 10/2014 | Roberts ................. | G06T 19/006 345/633 |
| 2015/0302650 A1 | 10/2015 | Abdelmoati et al. | |
| 2015/0325047 A1 | 11/2015 | Conner et al. | |
| 2015/0339453 A1 | 11/2015 | Richards et al. | |
| 2016/0291922 A1* | 10/2016 | Montgomery ....... | G06T 19/006 |
| 2017/0025040 A1 | 1/2017 | Maturana et al. | |
| 2017/0053441 A1 | 2/2017 | Nadumane et al. | |
| 2017/0090970 A1 | 3/2017 | Baskaran et al. | |
| 2017/0168585 A1* | 6/2017 | Faaborg ................. | G06F 3/013 |
| 2017/0249785 A1 | 8/2017 | Hooper et al. | |
| 2017/0270971 A1 | 9/2017 | Anderson | |
| 2017/0344859 A1* | 11/2017 | Mo ........................ | G06K 9/66 |
| 2018/0122383 A1* | 5/2018 | Raanani ................ | G10L 15/265 |
| 2018/0203238 A1* | 7/2018 | Smith, Jr. ........... | G02B 27/0172 |
| 2018/0324229 A1* | 11/2018 | Ross ................... | H04L 65/4015 |
| 2019/0005838 A1* | 1/2019 | Yu .......................... | G06F 3/011 |

FOREIGN PATENT DOCUMENTS

| | | |
|---|---|---|
| CN | 105225551 A | 1/2016 |
| EP | 2203878 A2 | 7/2010 |
| EP | 2996015 A1 | 3/2016 |
| EP | 3151217 A1 | 4/2017 |
| JP | 2000122520 A | 4/2000 |
| JP | 2005134536 A | 5/2005 |
| JP | 2005258089 A | 9/2005 |
| JP | 2008165193 A | 7/2008 |
| JP | 2016011989 A | 1/2016 |
| JP | 2016080777 A | 5/2016 |
| KR | 20160127608 A | 11/2016 |
| KR | 20170005920 A | 1/2017 |
| WO | 2009112063 A2 | 9/2009 |
| WO | 2015028978 A1 | 3/2015 |
| WO | 2015053266 A1 | 4/2015 |
| WO | 2017014733 A1 | 1/2017 |

OTHER PUBLICATIONS

Virtalis, "Activewall—The Interactive 3D Virtual Reality System", 2011, 2 pages.
Virtalis, "Activewall—The Interactive 3D Virtual Reality System—Activewall Overview", Feb. 2017, 5 pages.
Schneider Electric, "EYESIM Immersive Training System", SimSci, May 2017, 4 pages.
Khaldi et al., "Effective and Efficient Virtual Engineering Based on Reliable Virtual Prototyping Solutions for the Oil and Gas Industry", Technical Paper, ESI, 2013, 5 pages.
McMullen, "EYESIM—The Gamification of Operator Training", SimSci, Nov. 2013, 3 pages.
Siemens, "COMOS Walkinside ITS (Immersive Training Simulator)", May 2017, 3 pages.
Siemens, "COMOS Walkinside", May 2017, 2 pages.
"Oil & Gas—Virtual and Augmented Reality in Energy: from Science Fiction to Science Fact", http://optech4d.com/oil-gas, May 2017, 3 pages.
"Augmented Reality—An integrated, hands-on solution", http://optech4d.com/ar, May 2017, 2 pages.
"Virtual Reality for Enterprise", http://optech4d.com/vr, May 2017, 3 pages.
Rovaglio et al., "Immersive Virtual Reality Plant—A Comprehensive Plant-Crew Training Solution Improves Reliability and Safety", Invensys—White Paper, SimSci, 2010, 10 pages.
Leeuw et al., "Good Asset Information Management Practices Improve Reliability and Reduce Operational and Safety Risks", ARC White Paper, Oct. 2012, 19 pages.
"Virtual Prototyping Software and Services—Oil & Gas", ESI Group, 2015, 3 pages.
"Remote AR", Scope AR, http://www.scopear.com/products/remote-ar/, May 2017, 4 pages.
"Production", Scope AR, http://www.scopear.com/products/production/, May 2017, 6 pages.
"Worklink", Scope AR, http://www.scopear.com/products/worklink/, May 2017, 6 pages.
Dudekula et al., "Apparatus and Method for Recording and Replaying Interactive Content in Augmented/Virtual Reality in Industrial Automation Systems and Other Systems", U.S. Appl. No. 15/942,155, filed Mar. 30, 2018, 30 pages.
Dutta et al., "Apparatus and Method for Assessing and Tracking User Competency in Augmented/Virtual Reality-Based Training in (56) References Cited

OTHER PUBLICATIONS

Industrial Automation Systems and Other Systems", U.S. Appl. No. 15/941,545, filed Mar. 30, 2018, 28 pages.

* cited by examiner

APPARATUS AND METHOD FOR VISUAL-ASSISTED TRAINING, COLLABORATION, AND MONITORING IN AUGMENTED/VIRTUAL REALITY IN INDUSTRIAL AUTOMATION SYSTEMS AND OTHER SYSTEMS

CROSS-REFERENCE TO RELATED APPLICATIONS AND PRIORITY CLAIM

This application claims priority under 35 U.S.C. § 119(e) to U.S. Provisional Patent Application No. 62/517,006, U.S. Provisional Patent Application No. 62/517,015, and U.S. Provisional Patent Application No. 62/517,037, all filed on Jun. 8, 2017. These provisional applications are hereby incorporated by reference in their entirety.

TECHNICAL FIELD

This disclosure generally relates to augmented reality and virtual reality systems. More specifically, this disclosure relates to an apparatus and method for visual-assisted training, collaboration, and monitoring in augmented/virtual reality in industrial automation systems and other systems.

BACKGROUND

Augmented reality and virtual reality technologies are advancing rapidly and becoming more and more common in various industries. Augmented reality generally refers to technology in which computer-generated content is superimposed over a real-world environment. Examples of augmented reality include games that superimpose objects or characters over real-world images and navigation tools that superimpose information over real-world images. Virtual reality generally refers to technology that creates an artificial simulation or recreation of an environment, which may or may not be a real-world environment. An example of virtual reality includes games that create fantasy or alien environments that can be explored by users.

SUMMARY

This disclosure provides an apparatus and method for visual-assisted training, collaboration, and monitoring in augmented/virtual reality in industrial automation systems and other systems.

In a first embodiment, a method includes receiving first data defining first user actions associated with a first augmented reality/virtual reality (AR/VR) space. The method also includes translating the first user actions into first commands associated with first visual objects in the first AR/VR space. The method further includes aggregating the first commands into at least one first record and transmitting the at least one first record. The method also includes receiving at least one second record containing second commands associated with second visual objects in a second AR/VR space. The method further includes translating the second commands into second user actions. In addition, the method includes creating or causing a user device to create a replica of the second AR/VR space based on the second user actions.

In a second embodiment, an apparatus includes at least one processing device configured to receive first data defining first user actions associated with a first AR/VR space. The at least one processing device is also configured to translate the first user actions into first commands associated with first visual objects in the first AR/VR space. The at least one processing device is further configured to aggregate the first commands into at least one first record and to transmit the at least one first record. The at least one processing device is also configured to receive at least one second record containing second commands associated with second visual objects in a second AR/VR space. The at least one processing device is further configured to translate the second commands into second user actions. In addition, the at least one processing device is configured to create or cause a user device to create a replica of the second AR/VR space based on the second user actions.

In a third embodiment, a method includes receiving, from a first user, a request to subscribe associated with a second user. The method also includes receiving, from the second user, one or more records containing commands, an association of the commands with visual objects in an AR/VR space, and an AR/VR environment setup. The method further includes publishing the one or more records to the first user.

In a fourth embodiment, an apparatus includes at least one processing device configured to perform the method of the third embodiment or any of its dependent claims. In a fifth embodiment, a non-transitory computer readable medium contains instructions that when executed cause at least one processing device to perform the method of the first embodiment or any of its dependent claims. In a sixth embodiment, a non-transitory computer readable medium contains instructions that when executed cause at least one processing device to perform the method of the third embodiment or any of its dependent claims.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, augmented reality and virtual reality technologies are advancing rapidly, and various potential uses for augmented reality and virtual reality technologies have been devised. For example, current augmented/virtual reality solutions provide various ways to assist a user in performing an intended task on a given piece of equipment or other object, such as repairing a wire in an automobile. This is done conventionally by visually indicating or highlighting the object and showing an intended action, typically along with some kind of voice augmentation. However, if the equipment or procedure is complex, the number of visual assistance steps can grow quickly, and the training procedure can become very tedious.

A better way would be for a trainee to see a trainer do the same procedure (preferably in real-time or near real-time), learn fast, and perform the same task. To accomplish this, the trainee's AR/VR environment could accommodate a replica of the trainer's AR/VR environment, and the trainer's actions could be transferred to the replica of the trainer's AR/VR environment. However, this requires that the trainee's environment be split into separate views (the trainee's AR/VR environment and the replica of the trainer's AR/VR environment) that are independently processed in real-time. This becomes more complex when multiple trainers are involved in a training procedure. A similar problem occurs when a single trainer wants to monitor the actions of multiple trainees in real-time or near real-time while performing a training procedure.

This disclosure provides techniques for mirroring multiple users' virtual spaces and actions in an AR/VR environment. These techniques address technical constraints with respect to space, computation, and bandwidth requirements while enabling the mirroring capability. Among other things, this disclosure describes a portable file format that captures content such as user inputs, data formats, and training setups. The portable file format allows for easier storage, computation, and distribution of content and addresses technical constraints with respect to space, computation, and bandwidth.

Figure 1:
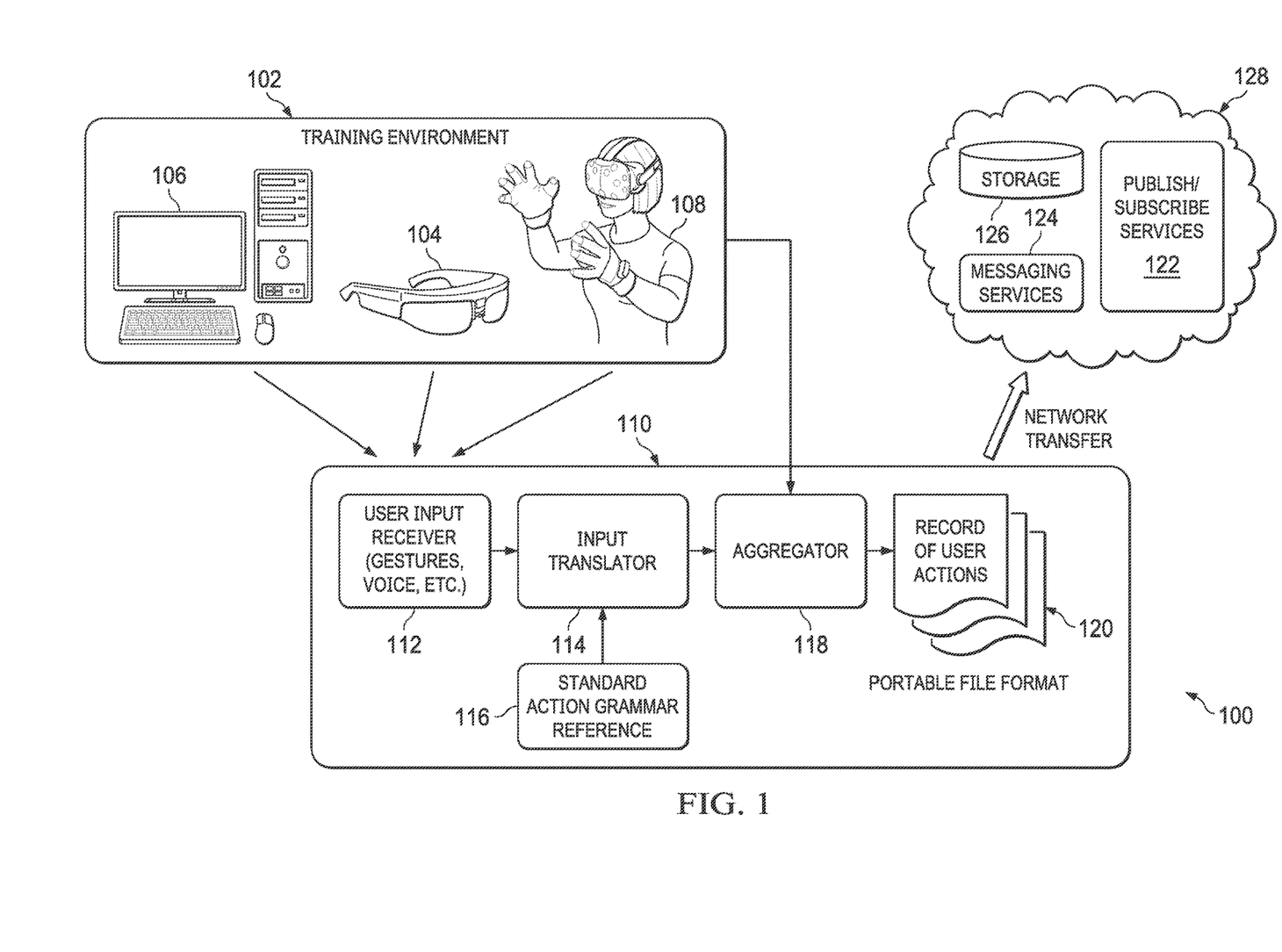
FIG. 1 illustrates an example architecture for capturing interactive content in augmented/virtual reality according to this disclosure.

FIG. 1 illustrates an example architecture 100 for capturing interactive content in augmented/virtual reality according to this disclosure. As shown in FIG. 1, the architecture 100 includes a training environment 102, which denotes a visualization layer that allows interaction with an augmented reality/virtual reality (AR/VR) space. In this example, the training environment 102 can include one or more end user devices, such as at least one AR/VR headset 104, at least one computing device 106, or at least one interactive AR/VR system 108. Each headset 104 generally denotes a device that is worn by a user and that displays an AR/VR space. The headset 104 in FIG. 1 is a MICROSOFT HOLOLENS device, although any other suitable AR/VR device could be used. Each computing device 106 generally denotes a device that processes data to present an AR/VR space (although not necessarily in a 3D format) to a user. Each computing device 106 denotes any suitable computing device, such as a desktop computer, laptop computer, tablet computer, or smartphone. Each interactive AR/VR system 108 includes a headset and one or more user input devices, such as interactive or smart gloves. Although not shown, one or more input devices could also be used with the headset 104 or the computing device 106.

The architecture 100 also includes at least one processor, such as in a server 110, that is used to capture training content or other interactive content. The server 110 generally denotes a computing device that receives content from the training environment 102 and records and processes the content. The server 110 includes various functions or modules to support the recording and processing of interactive content. Each of these functions or modules could be implemented in any suitable manner, such as with software/firmware instructions executed by one or more processors. The server 110 could be positioned locally with or remote from the training environment 102.

Functionally, the server 110 includes a user input receiver 112, which receives, processes, and filters user inputs made by the user. The user inputs could include any suitable inputs, such as gestures made by the user, voice commands or voice annotations spoken by the user, textual messages provided by the user, or pointing actions taken by the user using a pointing device (such as a smart glove). Any other or additional user inputs could also be received. The user inputs can be filtered in any suitable manner and are output to an input translator 114. To support the use of the architecture 100 by a wide range of users, input variants (like voice/text in different languages) could be supported. The user input receiver 112 includes any suitable logic for receiving and processing user inputs.

The input translator 114 translates the various user inputs into specific commands by referring to a standard action grammar reference 116. The grammar reference 116 represents an actions-to-commands mapping dictionary that associates different user input actions with different commands. For example, the grammar reference 116 could associate certain spoken words, text messages, or physical actions with specific commands. The grammar reference 116 could support one or multiple possibilities for commands where applicable, such as when different commands may be associated with the same spoken words or text messages but different physical actions. The grammar reference 116 includes any suitable mapping or other association of actions and commands. The input translator 114 includes any suitable logic for identifying commands associated with received user inputs.

The input translator 114 outputs identified commands to an aggregator 118. The aggregator 118 associates the commands with visual objects in the AR/VR space being presented to the user into one or more records 120. The aggregator 118 also embeds an AR/VR environment setup into the one or more records 120. The AR/VR environment setup can define what visual objects are to be presented in the AR/VR space. The records 120 therefore associate specific commands (which were generated based on user inputs) with specific visual objects in the AR/VR space as defined by the environment setup. The aggregator 118 includes any suitable logic for aggregating data.

The records 120 are created in a portable file format, which allows the records 120 to be used by various other user devices. For example, the data in the records 120 can be used by other user devices to recreate the AR/VR space and the actions taken in the AR/VR space (either automatically or in a user-driven manner). Effectively, this allows the actions of one user to be replicated in the AR/VR space of another user. The portable file format could be defined in any suitable manner, such as by using XML or JSON.

The records 120 could be used in various ways. In this example, a publish/subscribe service 122 and one or more messaging services 124 are used to support the exchange of the records 120 between various users. For example, the publish/subscribe service 122 allows various users to subscribe to other users' records. When a specified user publishes a record 120, the publish/subscribe service 122 identifies which other users have subscribed to the specified user's records, and the publish/subscribe service 122 sends the record 120 from the specified user to the other identified users. Records 120 can be received from and sent to users via the messaging services 124. The publish/subscribe service 122 includes any suitable logic allowing users to publish information and to subscribe to publications of AR/VR activities. Each messaging service 124 includes any suitable logic for sending and receiving records of AR/VR activities. A database 126 could be used to store the messages that are sent and received via the messaging service 124, such as for logging or other purposes. In this example, the components 122-126 are implemented within a cloud computing environment 128, although any other suitable implementation of the components 122-126 could be used.

The publish/subscribe service 122 allows multiple users to collaborate in a real-time or near real-time AR/VR training environment or other environment. For example, training applications or other applications use the portable file format to capture and distribute each user's actions within the context of the user inputs, the hardware environment, and so on. The applications have the ability to create multiple "views" to host parallel sessions across different trainers and trainees or other users. In the following discussion, a "trainer view" denotes a view of an AR/VR training environment as seen by and interacted with a trainer. A "trainee view" denotes a view of an AR/VR training environment as seen by and interacted with a trainee. A "replica view" denotes a view of an AR/VR training environment for one user that is network transferred (such as in real-time or near real-time) to one or more other users (such as in a collaborative session).

Based on this, the following process could be performed using the various components in FIG. 1. A trainer, trainee, or other application executing in an AR/VR space, on a mobile device, or on any other suitable device initiates a recording and sends user input action details (such as gestures, voice, and textual messages) to the user input receiver 112. The user input receiver 112 detects and tracks the user input actions (such as gestures, voice, textual messages, and pointing device actions), filters the actions as needed, and passes the selected/filtered actions to the input translator 114. The input translator 114 converts the user actions into system-understandable commands by referring to the grammar reference 116, and the input translator 114 passes these commands to the aggregator 118. The aggregator 118 associates the system-understandable commands to visual objects, embeds the AR/VR environment setup, and prepares one or more records 120 in a portable file format. The records 120 are processed and sent to the publish/subscribe service 122. The publish/subscribe service 122 leverages the messaging service(s) 124 to send the incoming records 120 to other users who have subscribed to the trainer, trainee, or other user using the architecture 100.

In this way, the architecture 100 can be used to capture and store users' actions in AR/VR environments. As a result, training data and other data associated with the AR/VR environments can be easily captured, stored, and distributed in the records 120. Other devices and systems can use the records 120 to recreate the AR/VR environments and allow other people to view the users' actions in the AR/VR environments, easily allowing replicas of the AR/VR environments to be created and viewed. The records 120 can occupy significantly less space in memory and require significantly less bandwidth for transmission, reception, and storage compared to alternatives such as video/image recording. Moreover, the records 120 can be used to recreate the AR/VR environments and users' actions in the AR/VR environments with significantly less computational requirements compared to alternatives such as video/image reconstruction and playback. These features can provide significant technical advantages, such as in systems that use large amounts of interactive data in a number of AR/VR environments.

Although FIG. 1 illustrates one example of an architecture 100 for capturing interactive content in augmented/virtual reality, various changes may be made to FIG. 1. For example, the architecture 100 could support any number of training environments 102, headsets 104, computing devices 106, AR/VR systems 108, servers 110, or other components. Also, the records 120 could be used in any other suitable manner. In addition, while described as being used with or including a training environment 102 and generating records 120, the architecture 100 could be used with or include any suitable environment 102 and be used to generate any suitable records 120 containing interactive content (whether or not used for training purposes).

Figure 2:
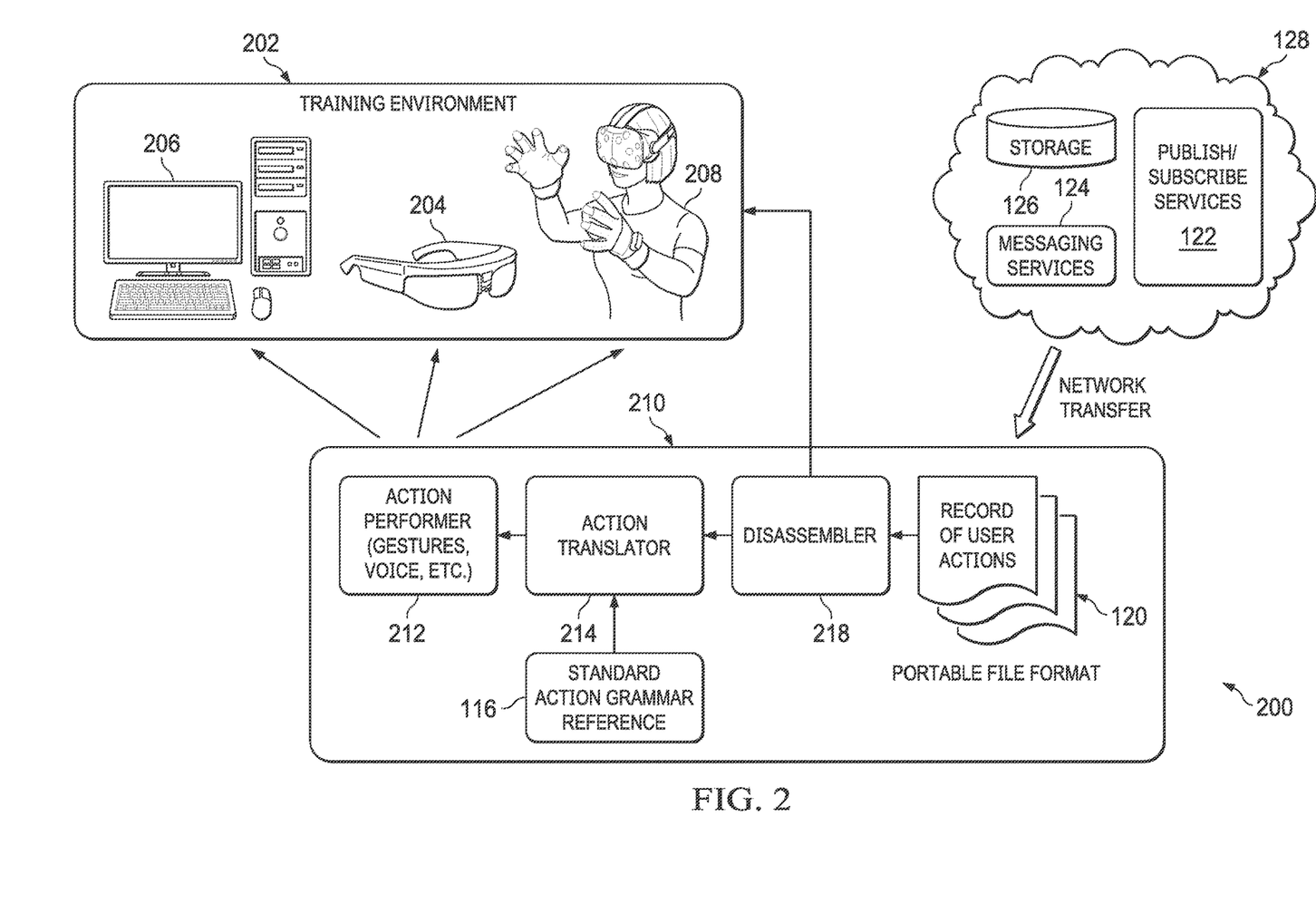
FIG. 2 illustrates an example architecture for distributing interactive content for replay in augmented/virtual reality according to this disclosure.

FIG. 2 illustrates an example architecture 200 for distributing interactive content for replay in augmented/virtual reality according to this disclosure. The architecture 200 in FIG. 2 is similar to the architecture 100 in FIG. 1, but the architecture 200 in FIG. 2 is used to replay interactive content that could have been captured using the architecture 100 in FIG. 1.

As shown in FIG. 2, the architecture 200 includes a training environment 202, which may or may not be similar to the training environment 102 described above. In this example, the training environment 202 includes at least one headset 204, at least one computing device 206, or at least one interactive AR/VR system 208. Note that these devices 204-208 may or may not be the same as the devices 104-108 in FIG. 1. Since the records 120 are in a portable file format, the records 120 can be generated and used by different types of devices.

The architecture 200 also includes at least one processor, such as in a server 210, that is used to replay training content or other interactive content. For example, the server 210 could receive one or more records 120 (such as from the messaging service 124) and replay the interactive content from the records 120 for one or more users. The server 210 includes various functions or modules to support the replay of interactive content. Each of these functions or modules could be implemented in any suitable manner, such as with software/firmware instructions executed by one or more processors. The server 210 could be positioned locally with or remote from the training environment 202. The server 210 could also denote the server 110 in FIG. 1, allowing the server 110/210 to both record and replay content.

Functionally, the server 210 includes a disassembler 218, which separates each record 120 into separate data elements. The separate data elements could relate to various aspects of an AR/VR space, such as data related to the visual environment overall, data related to specific visual objects, and commands. The disassembler 218 can output the data related to the visual environment and the visual objects to the training environment 202. The training environment 202 can use this information to cause the appropriate user device 204-208 to recreate the overall visual environment and the visual objects in the visual environment within an AR/VR space being presented by the user device. The disassembler 218 can also output commands to a command translator 214. The disassembler 218 includes any suitable logic for separating data in records.

The command translator 214 translates the various commands into specific user actions by referring to the standard action grammar reference 116. This allows the command translator 214 to map the commands back into user actions, effectively reversing the mapping done by the input translator 114. The command translator 214 includes any suitable logic for identifying user actions associated with received commands.

The command translator 214 outputs the user actions to an action performer 212. The action performer 212 interacts with the training environment 202 to cause the appropriate user device 204-208 to render the identified user actions and replay the user actions within the AR/VR space being presented by the user device. At least some of the user actions in the AR/VR space can be recreated based on the associations of the commands with specific visual objects in the AR/VR space. This allows the AR/VR environment to be recreated for the user based on the interactive content in a record 120. The user could, for example, see how someone else controls an industrial process or repairs equipment. To support the use of the architecture 200 by a wide range of users, output variants (like voice/text in different languages) could be supported. The action performer 212 includes any suitable logic for creating actions within an AR/VR environment.

Based on this, the following process could be performed using the various components in FIG. 2. The publish/subscribe service 122 leverages the underlying messaging service(s) 124 to distribute a record 120 of user actions to various subscribed trainer, trainee, or other applications. The trainer, trainee, or other applications process incoming messages and post them to the correct replica views. Each replica view represents the same view as a remote trainer, trainee, or other interactive AR/VR environment. A trainer could have a replica view of each trainee's AR/VR environment in order to view what each trainee is doing. A trainee could have a replica view of each trainer's AR/VR environment in order to view what each trainer is doing. Depending on the implementation, a trainee may or may not have a replica view of other trainees, and each trainer may or may not have a replica view of other trainers. For each record 120, the disassembler 218 separates the record 120 into data related to the visual environment, visual objects, and commands. The disassembler 218 passes the visual environment and visual object details to the training environment 202 and passes the commands to the command translator 214. The command translator 214 converts the commands to user actions by referring to the grammar reference 116 and passes the user actions to the action performer 212. The action performer 212 renders the user actions and replays them in the visual environment.

In this way, the architecture 200 can be used to recreate one or more people's actions in one or more AR/VR environments. As a result, training data and other data associated with the AR/VR environments can be easily obtained and used to recreate the AR/VR environments, allowing users to view other people's actions in replica AR/VR environments. The records 120 can occupy significantly less space in memory and require significantly less bandwidth for reception and storage compared to alternatives such as video/image recording. Moreover, the records 120 can be used to recreate the AR/VR environments and people's actions in the AR/VR environments with significantly less computational requirements compared to alternatives such as video/image reconstruction and playback. These features can provide significant technical advantages, such as in systems that use large amounts of interactive data in a number of AR/VR environments.

Although FIG. 2 illustrates one example of an architecture 200 for replaying interactive content in augmented/virtual reality, various changes may be made to FIG. 2. For example, the architecture 200 could support any number of training environments 202, headsets 204, computing devices 206, AR/VR systems 208, servers 210, or other components. Also, the records 120 could be used in any other suitable manner. In addition, while described as being used with or including a training environment 202 and using records 120, the architecture 200 could be used with or include any suitable environment 202 and be used with any suitable records 120 containing interactive content (whether or not used for training purposes).

Note that while the architectures 100 and 200 in FIGS. 1 and 2 are shown separately with different user devices 104-108/204-208, the architectures 100 and 200 could be implemented together. In such a case, a single server 110/210 could both capture content associated with a specific user and replay content from other users. This may allow, for example, a single user to both (i) send data identifying what that user is doing in his or her AR/VR environment and (ii) receive data identifying what one or more other users are doing in their AR/VR environments.

Also note that while the recording and playback of training content is one example use of the devices and techniques described above, other uses of the devices and techniques are also possible. For example, these devices and techniques could allow the server 110 to generate training content or other interactive content that is stored for later playback, rather than being used in a collaborative or other real-time or near real-time session. As another example, these devices and techniques could be used to record and recreate users' actions in any suitable AR/VR space, and the users' actions may or may not be used for training purposes.

Figure 3:
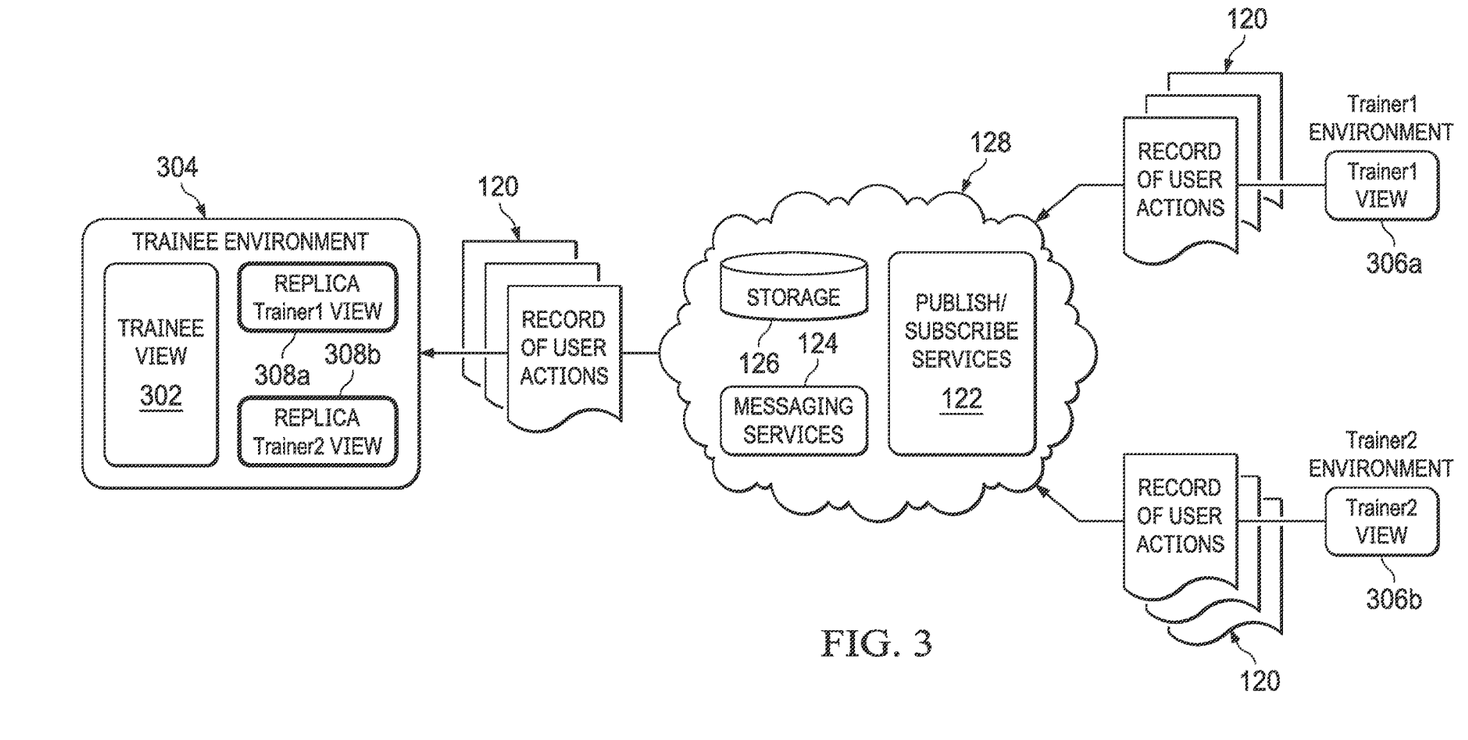
FIGS. 3 through 5 illustrate example uses of the architectures of FIGS. 1 and 2 according to this disclosure.
Figure 4:
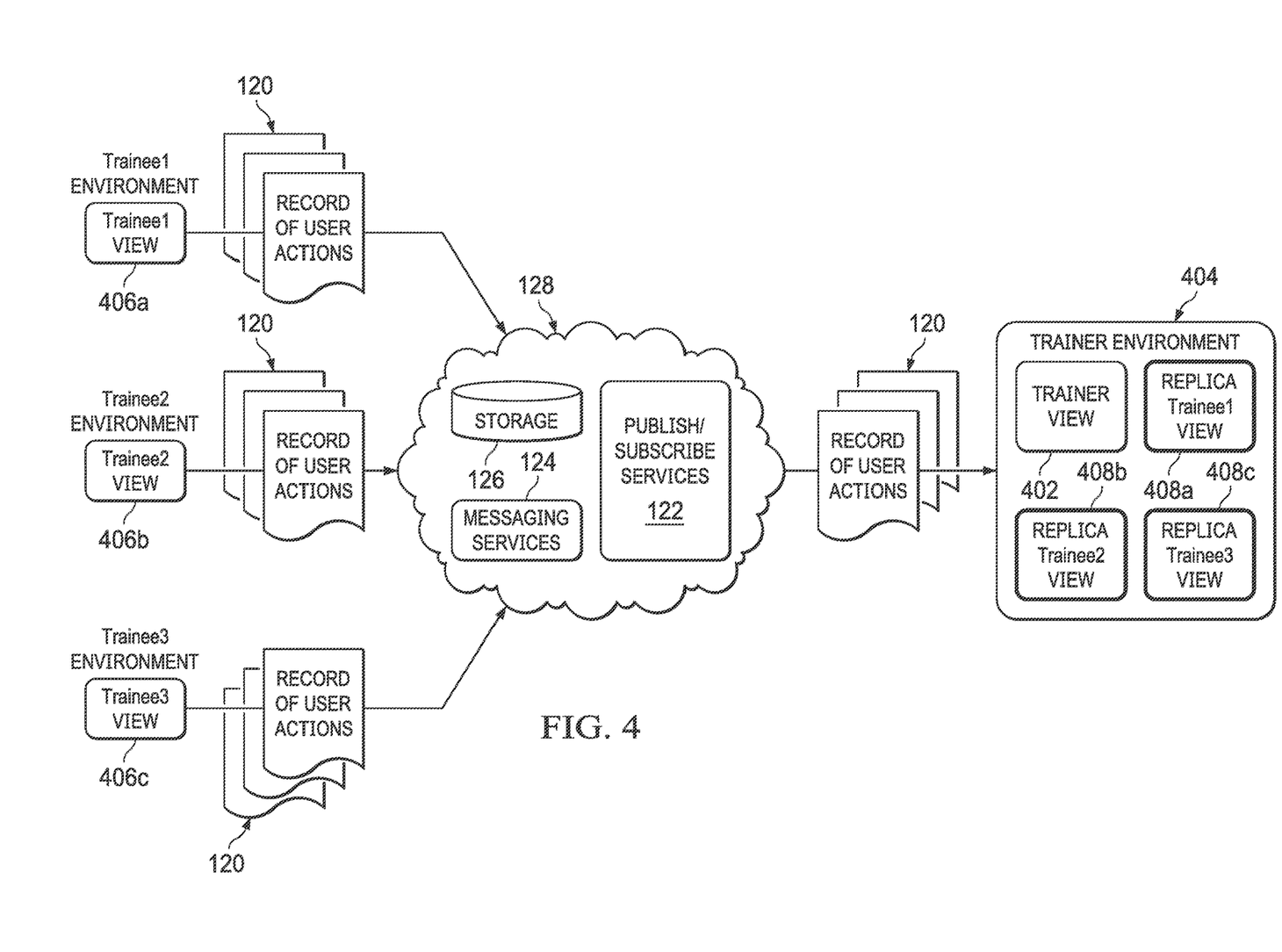
Figure 5:
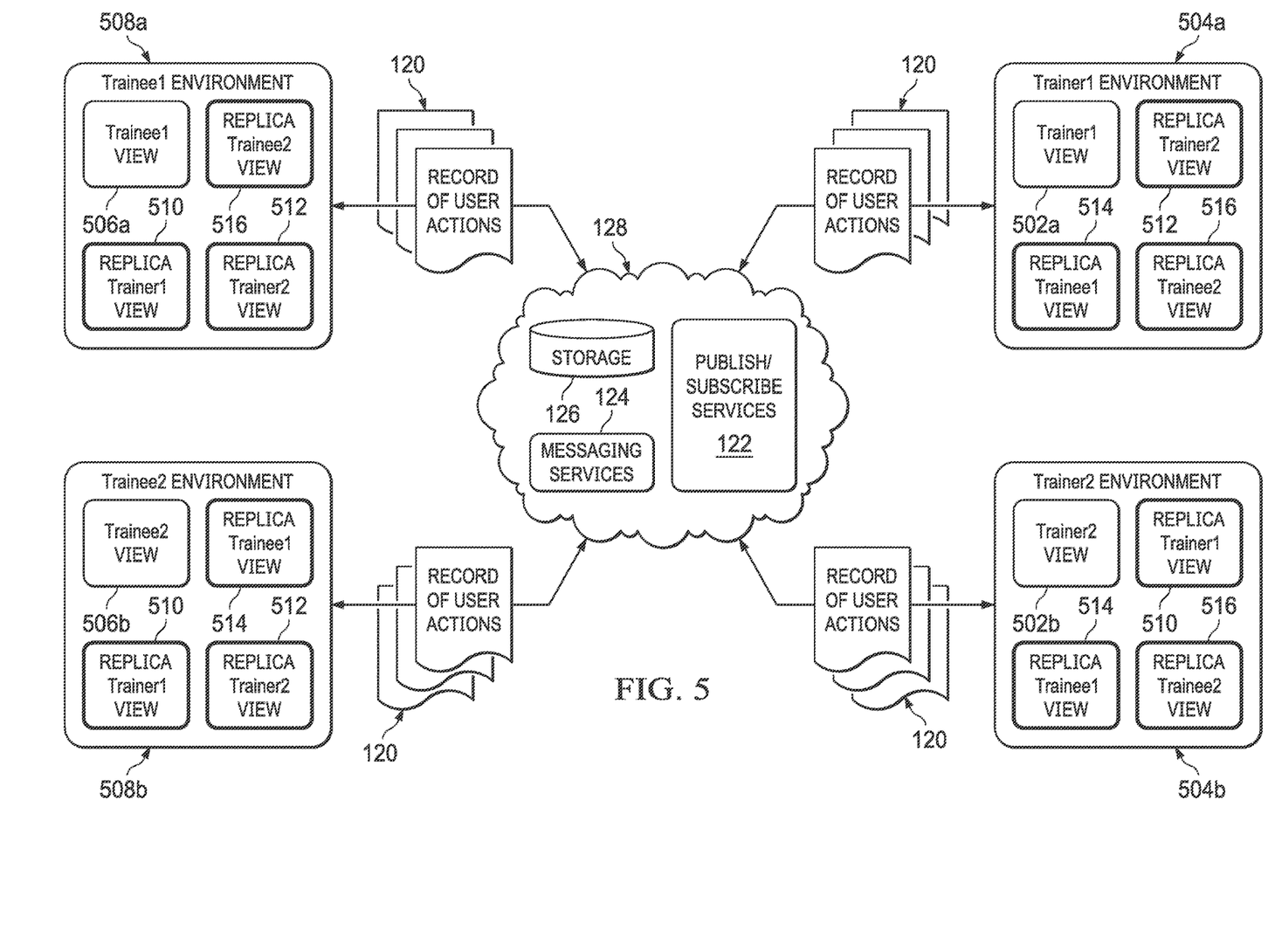

The ability to capture and distribute actions in AR/VR environments can be used in a number of scenarios or use cases. FIGS. 3 through 5 illustrate example uses of the architectures of FIGS. 1 and 2 according to this disclosure. Note that these scenarios or use cases are examples only and that the architectures of FIGS. 1 and 2 could be used in any other suitable manner.

In FIG. 3, a single trainee is collaborating with multiple trainers. The trainee has his or her own view 302 within an AR/VR environment 304. The AR/VR environment 304 could be presented, for example, using any of the user devices 204-208 described above. The trainee's view 302 can present an overall visual environment with any number of visual objects, and the trainee can provide various inputs associated with those visual objects (such as gestures, voice, and textual messages). The trainee is interacting with the multiple trainers, each of whom has his or her own view 306a-306b within an AR/VR environment. Each trainer's view 306a-306b can present an overall visual environment with any number of visual objects, and the associated trainer can provide various inputs associated with those visual objects (such as gestures, voice, and textual messages). The AR/VR environment of each trainer could be presented, for example, using any of the user devices 104-108 described above.

Records 120 associated with the trainers' views 306a-306b are provided to the trainee's AR/VR environment 304 and are used to create replica views 308a-308b. The replica views 308a-308b recreate the trainers' views 306a-306b so that the trainee is able to view replicas of the trainers' AR/VR environments. This may allow, for example, the trainee to view what the trainers are doing in their AR/VR environments.

In FIG. 4, a single trainer is collaborating with multiple trainees. The trainer has his or her own view 402 within an AR/VR environment 404. The AR/VR environment 404 could be presented, for example, using any of the user devices 204-208 described above. The trainer's view 402 can present an overall visual environment with any number of visual objects, and the trainer can provide various inputs associated with those visual objects (such as gestures, voice, and textual messages). The trainer is interacting with the multiple trainees, each of whom has his or her own view 406a-406c within an AR/VR environment. Each trainee's view 406a-406c can present an overall visual environment with any number of visual objects, and the associated trainee can provide various inputs associated with those visual objects (such as gestures, voice, and textual messages).

Records 120 associated with the trainees' views 406a-406c are provided to the trainer's AR/VR environment 404 and are used to create replica views 408a-408c. The replica views 408a-408c recreate the trainees' views 406a-406c so that the trainer is able to view replicas of the trainees' AR/VR environments. This may allow, for example, the trainer to view what the trainees are doing in their AR/VR environments. Note that while each trainee has his or her own view within an AR/VR environment, each trainee may or may not have a replica view of the trainer's AR/VR environment or other trainees' AR/VR environments. If a trainee does have a replica of the trainer's view 402, records 120 could be provided from the trainer's environment 404 to one or more of the trainee environments for creation of a replica view in the trainee environment(s). Each trainee may or may not also have replicas of other trainees' views.

In FIG. 5, multiple trainees and multiple trainers are interacting. Each trainer has his or her own view 502a-502b within his or her AR/VR environment 504a-504b, and each trainee has his or her own view 506a-506b within his or her AR/VR environment 508a-508b. Each AR/VR environment 504a-504b, 508a-508b could be presented, for example, using any of the user devices 104-108, 204-208 described above. Each view 502a-502b, 506a-506b can present an overall visual environment with any number of visual objects, and a trainer or trainee can provide various inputs associated with those visual objects (such as gestures, voice, and textual messages).

Records 120 associated with the various views 502a-502b, 506a-506b are exchanged between the various AR/VR environments 504a-504b, 508a-508b and are used to create replica views 510-516. The replica view 510 recreates the first trainer's view 502a, the replica view 512 recreates the second trainer's view 502b, the replica view 514 recreates the first trainee's view 506a, and the replica view 516 recreates the second trainee's view 506b. In this example, each trainer and trainee is able to view replica views of the other trainers' and trainees' AR/VR views, which allows each trainer and trainee to view what the other trainers and trainees are doing in their AR/VR environments.

In these examples, it can be seen that the architectures 100 and 200 described above make it easier and more efficient to capture one or more users' actions in an AR/VR space and to recreate those actions in one or more other users' AR/VR spaces. More specifically, records 120 can be generated that encapsulate the overall visual environment, the visual objects in the visual environment, and the user actions/commands associated with the visual objects for each AR/VR environment. These records can then be used to recreate each AR/VR environment so that the user actions/commands can be viewed.

This technology can find use in a number of ways in industrial automation settings or other settings. For example, control and safety systems and related instrumentations used in industrial plants (such as refinery, petrochemical, and pharmaceutical plants) are often very complex in nature. It may take a lengthy period of time (such as more than five years) to train new system maintenance personnel to become proficient in managing plant and system upsets independently. Combining such long delays with a growing number of experienced personnel retiring in the coming years means that industries are facing acute skill shortages and increased plant upsets due to the lack of experience and skill.

Traditional classroom training, whether face-to-face or online, often requires personnel to be away from the field for an extended time (such as 20 to 40 hours). In many cases, this is not practical, particularly for plants that are already facing resource and funding challenges due to overtime, travel, or other issues. Also, few sites have powered-on and functioning control hardware for training. Due to the fast rate of change for technology, it may no longer be cost-effective to procure and maintain live training systems.

Simulating control and safety system hardware in the AR/VR space, building dynamics of real hardware modules in virtual objects, and interfacing the AR/VR space with real supervisory systems (such as engineering and operator stations) can provide various benefits. For example, it can reduce or eliminate any dependency on real hardware for competency management. It can also "gamify" the learning of complex and mundane control and safety system concepts, which can help to keep trainees engaged. It can further decrease the time needed to become proficient in control and safety system maintenance through more hands-on practice sessions and higher retention of the training being imparted.

This represents example ways in which the devices and techniques described above could be used. However, these examples are non-limiting, and the devices and techniques described above could be used in any other suitable manner. In general, the devices and techniques described in this patent document could be applicable whenever one or more user actions in an AR/VR space are to be recorded, stored, and recreated in an AR/VR space for one or more other users (for whatever purpose).

Although FIGS. 3 through 5 illustrate example uses of the architectures of FIGS. 1 and 2, various changes may be made to FIGS. 3 through 5. For example, the architectures of FIGS. 1 and 2 could be used in a large number of ways, and FIGS. 3 through 5 do not limit the uses of the architectures to the three specific examples shown here.

Figure 6:
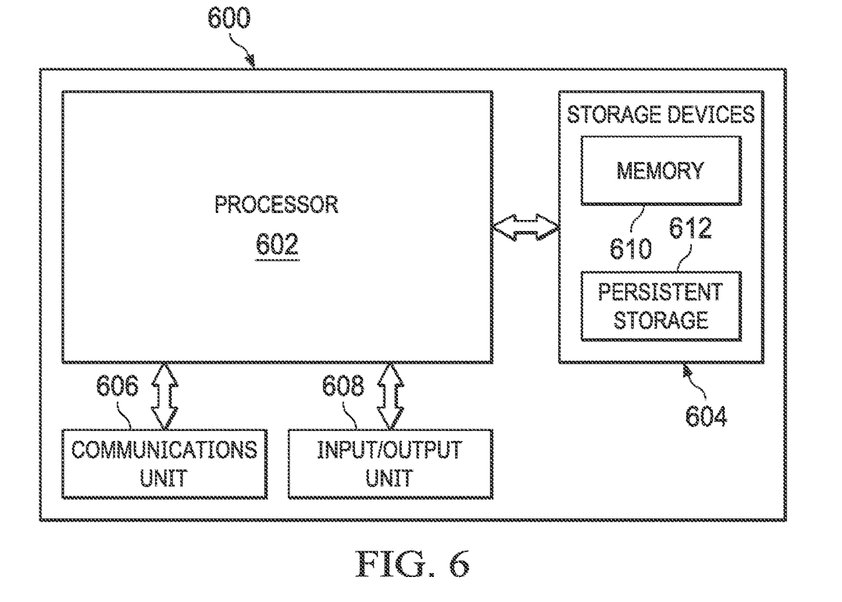
FIG. 6 illustrates an example device that supports capturing and replaying of interactive content in augmented/virtual reality according to this disclosure.

FIG. 6 illustrates an example device that supports capturing and replaying of interactive content in augmented/virtual reality according to this disclosure. For example, the device 600 could represent either or both of the servers 110, 210. Note that the same device 600 could be used to both record and replay training content or other interactive content, although this is not required. The device 600 could also represent a device that implements the publish/subscribe service 122 described above.

As shown in FIG. 6, the device 600 includes at least one processing device 602, at least one storage device 604, at least one communications unit 606, and at least one input/output (I/O) unit 608. The processing device 602 executes instructions that may be loaded into a memory 610, such as instructions that (when executed by the processing device 602) implement the functions of the server 110 and/or the server 210. The processing device 602 includes any suitable number(s) and type(s) of processors or other devices in any suitable arrangement. Example types of processing devices 602 include microprocessors, microcontrollers, digital signal processors, field programmable gate arrays, application specific integrated circuits, and discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 could include a network interface card or a wireless transceiver facilitating communications over a wired or wireless network (such as a local intranet or a public network like the Internet). The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display, printer, or other suitable output device.

Although FIG. 6 illustrates one example of a device 600 that supports capturing and replaying of interactive content in augmented/virtual reality, various changes may be made to FIG. 6. For example, computing devices come in a wide variety of configurations, and FIG. 6 does not limit this disclosure to any particular computing device.

Figure 7:
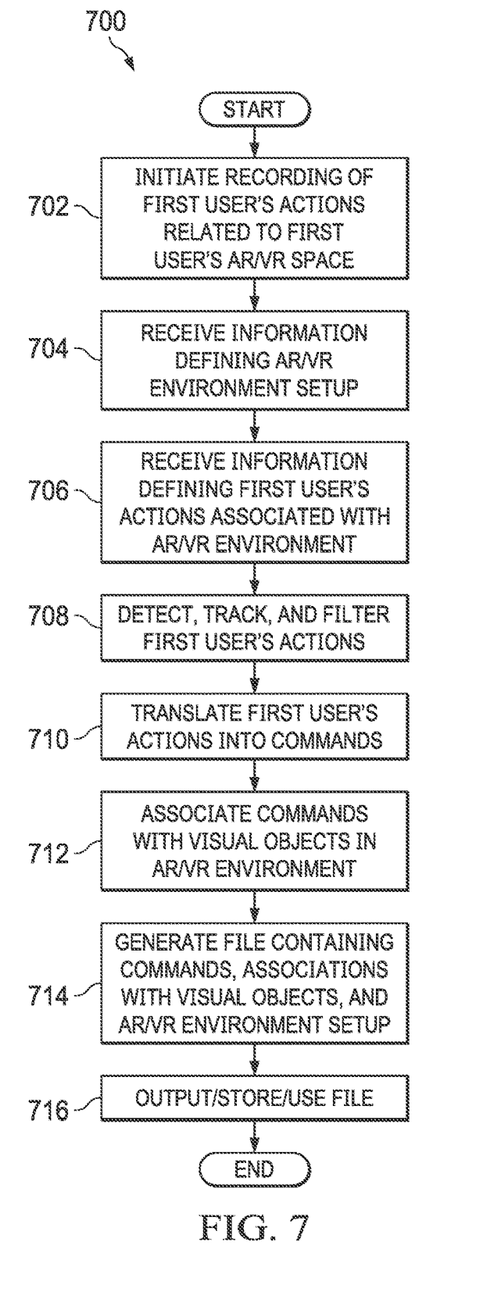
FIGS. 7 through 9 illustrate example methods for visual-assisted training, collaboration, and monitoring in augmented/virtual reality according to this disclosure.
Figure 8:
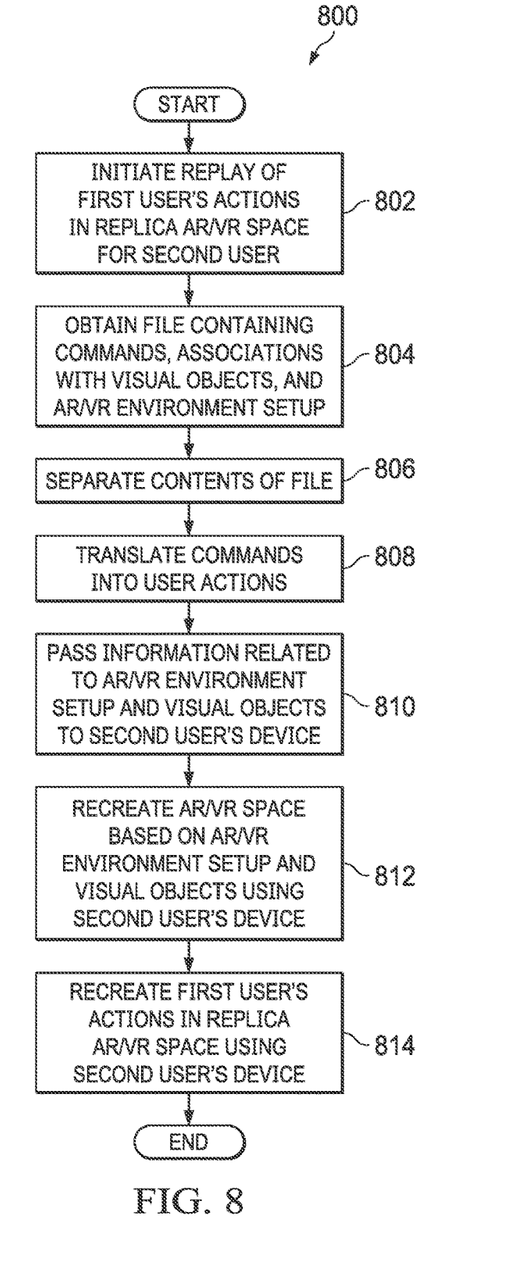
Figure 9:
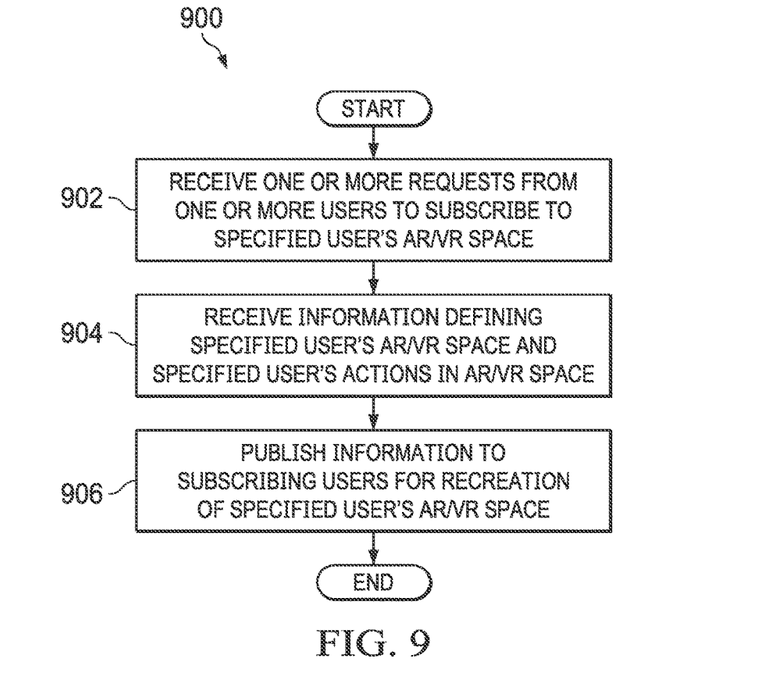

FIGS. 7 through 9 illustrate example methods for visual-assisted training, collaboration, and monitoring in augmented/virtual reality according to this disclosure. In particular, FIG. 7 illustrates an example method 700 for recording interactive content in augmented/virtual reality, FIG. 8 illustrates an example method 800 for replaying interactive content in augmented/virtual reality, and FIG. 9 illustrates an example method 900 supporting subscription and distribution of interactive content in augmented/virtual reality. For ease of explanation, the methods 700 and 800 are described as being performed using the device 300 operating as the server 110 in FIG. 1 (method 700) or as the server 210 in FIG. 2 (method 800). Also, for ease of explanation, the method 900 is described as being performed using the device 300 operating as the publish/subscribe service 122 in FIGS. 1 and 2. However, the methods 700, 800, and 900 could be used with any suitable devices and in any suitable systems.

As shown in FIG. 7, the method 700 can be supported for an AR/VR space in which a first user's actions are being recorded for replication by other users. Of course, the same or similar operations could be used to record any number of users' actions in any number of AR/VR spaces. In FIG. 7, a recording of the first user's actions related to the first user's AR/VR space is initiated at step 702. This could include, for example, the processing device 302 of the server 110 receiving an indication from a user device 104-108 that the first user wishes to initiate the recording. Information defining an AR/VR environment setup is received at step 704. This could include, for example, the processing device 302 of the server 110 receiving information identifying the overall visual environment of the AR/VR space being presented to the first user by the user device 104-108 and information identifying visual objects in the AR/VR space being presented to the first user by the user device 104-108.

Information defining the first user's actions associated with the AR/VR environment is received at step 706. This could include, for example, the processing device 302 of the server 110 receiving information identifying how the first user is interacting with one or more of the visual objects presented in the first user's AR/VR space by the user device 104-108. The interactions could take on various forms, such as the first user making physical gestures, speaking voice commands, speaking voice annotations, or providing textual messages. This information is used to detect, track, and filter the first user's actions at step 708. This could include, for example, the processing device 302 of the server 110 processing the received information to identify distinct gestures, voice commands, voice annotations, or textual messages that occur. This could also include the processing device 302 of the server 110 processing the received information to identify visual objects presented in the first user's AR/VR space that are associated with those user actions.

The first user's actions are translated into commands at step 710. This could include, for example, the processing device 302 of the server 110 using the standard action grammar reference 116 and its actions-to-commands mapping dictionary to associate different user actions with different commands. Specific commands are associated with specific visual objects presented in the first user's AR/VR space at step 712. This could include, for example, the processing device 302 of the server 110 associating specific ones of the identified commands with specific ones of the visual objects presented in the first user's AR/VR space. This allows the server 110 to identify which visual objects are associated with the identified commands.

At least one file is generated that contains the commands, the associations of the commands with the visual objects, and the AR/VR environment setup at step 714. This could include, for example, the processing device 302 of the server 110 generating a record 120 containing this information. The at least one file is output, stored, or used in some manner at step 716. This could include, for example, the processing device 302 of the server 110 providing the record 120 to the messaging service 124 for distribution to other users according to the publish/subscribe service 122.

As shown in FIG. 8, the method 800 can be supported for a second user wishing to view a replica of the first user's AR/VR space. Of course, the same or similar operations could be used to create any number of replicas for any number of users' AR/VR spaces. In FIG. 8, a replay of the first user's actions in a replica AR/VR space for the second user is initiated at step 802. This could include, for example, the processing device 302 of the server 210 receiving an indication from a user device 204-208 that the second user wishes to initiate the replay. A suitable file containing commands, associations of the commands with visual objects, and an AR/VR environment setup is obtained at step 804. This could include, for example, the processing device 302 of the server 210 obtaining a record 120 from the publish/subscribe service 122. The specific record 120 could be provided based on the second user's subscription to the first user or the first user's AR/VR space.

The contents of the file are separated at step 806. This could include, for example, the processing device 302 of the server 210 separating the data related to the AR/VR environment setup, the visual objects, and the commands. The commands are translated into user actions at step 808. This could include, for example, the processing device 302 of the server 210 using the standard action grammar reference 116 to associate different commands with different user actions. The specific commands (and therefore the specific user actions) are associated with specific visual objects to be presented in the second user's replica AR/VR space based on the association data contained in the record 120.

The information related to the AR/VR environment setup and the visual objects is passed to a user device at step 810.

This could include, for example, the processing device 302 of the server 210 passing the information to the second user's user device 204-208. The second user's user device recreates an AR/VR space based on the AR/VR environment setup and the visual objects at step 812, and the second user's user device recreates the first user's actions in the AR/VR space at step 814. This could include, for example, the user device 204-208 creating an overall visual environment using the AR/VR environment setup and displaying visual objects within the visual environment. This could also include the action performer 212 causing the user device 204-208 to recreate specific user actions in association with specific visual objects within the replica AR/VR environment.

As shown in FIG. 9, the method 900 can be supported to allow one or more users to subscribe to a specified user's AR/VR space. Of course, the same or similar operations could be used to allow any number of users to subscribe to any number of AR/VR spaces (or their associated users). As shown in FIG. 9, one or more subscription requests are received from one or more users at step 902. This could include, for example, the processing device 302 of the publish/subscribe service 122 receiving one or more requests from one or more users wishing to subscribe to a specified user's AR/VR space. Each request could contain any suitable information, such as the identity of the user or user device submitting the request and the identity of the specified user or the specified user's AR/VR space.

Information defining the specified user's AR/VR space and the specified user's actions in that AR/VR space is received at step 904. This could include, for example, the processing device 302 of the publish/subscribe service 122 receiving one or more records 120 from a server 110 or other device. The records 120 could be generated in the manner shown in FIG. 7 and described above. The records 120 can include information defining the specified user's overall visual environment, visual objects in the specified user's visual environment, and commands associated with the specified user's actions.

The information is published to the one or more subscribing users at step 906. This could include, for example, the processing device 302 of the publish/subscribe service 122 passing the one or more received records 120 to one or more servers 210 or other devices associated with the one or more subscribing users. For instance, the one or more records 120 could be published via the one or more messaging services 124. This allows the one or more servers 210 or other devices associated with the one or more subscribing users to generate one or more replicas of the specified user's AR/VR space.

As noted above, there are numerous configurations where users can subscribe to and publish information related to one or more AR/VR spaces. For example, a single publishing user could publish information to a single subscribing user, a single publishing user could publish information to multiple subscribing users, multiple publishing users could publish information to a single subscribing user, or multiple publishing users could publish information to multiple subscribing users. Moreover, any of these options could be used for any number of AR/VR spaces. In addition, there are multiple ways in which this functionality could be used to support various operations, such as training, collaboration, or monitoring.

Although FIGS. 7 through 9 illustrate examples of methods for visual-assisted training, collaboration, and monitoring in augmented/virtual reality, various changes may be made to FIGS. 7 through 9. For example, while each figure illustrates a series of steps, various steps in each figure could overlap, occur in parallel, occur in a different order or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrases "at least one of" and "one or more of," when used with a list of items, mean that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving first data defining first user actions associated with a first augmented reality/virtual reality (AR/VR) space, the first user actions made by a first user using a first AR/VR device that displays the first AR/VR space to the first user;
translating the first user actions into first commands associated with at least one of multiple first visual objects in the first AR/VR space;
aggregating the first commands, associations of the first commands with the at least one first visual object, and a first AR/VR environment setup that defines the first visual objects presented in the first AR/VR space into at least one first record;
transmitting the at least one first record for display by a second AR/VR device used by a second user;
receiving second data defining second user actions associated with a second augmented reality/virtual reality (AR/VR) space, the second user actions made by a second user using a second AR/VR device that displays the second AR/VR space to the second user;
translating the second user actions into second commands associated with at least one of multiple second visual objects in the second AR/VR space; and
displaying a replica of the first AR/VR space to the second user using the second AR/VR device based on the at least one first record while concurrently displaying the second AR/VR space to the second user using the second AR/VR device.

2. The method of claim 1, wherein the at least one first record has a portable file format.

3. The method of claim 1, wherein the first data defining the first user actions comprises one or more of:
data defining one or more gestures made by a user;
data defining one or more voice commands or voice annotations spoken by the user;
data defining one or more textual messages provided by the user; and
data defining one or more pointing actions taken by the user using at least one pointing device.

4. The method of claim 1, wherein translating the first user actions into the first commands comprises using a grammar reference that associates different user input actions with different commands.

5. The method of claim 1, wherein the first user is a trainee and the second user is a trainer, and thus the trainer is able to see what the trainee is doing via the replica of the first AR/VR space.

6. The method of claim 5, wherein the first user is a trainer and the second user is a trainee, and thus the trainee is able to see what the trainer is doing via the replica of the first AR/VR space.

7. The method of claim 1, further comprising:
receiving at least one third record containing third commands, associations of the third commands with the at least one third visual object, and a third AR/VR environment setup that defines the third visual objects presented in the third AR/VR space;
displaying a replica of the third AR/VR space to the second user using the second AR/VR device based on the at least one third record while also concurrently displaying the second AR/VR space and the first AR/VR space to the second user using the second AR/VR device.

8. The method of claim 1, wherein the second AR/VR device displays multiple replica views of multiple other users' AR/VR spaces.

9. An apparatus comprising:
at least one processing device configured to:
receive first data defining first user actions associated with a first augmented reality/virtual reality (AR/VR) space, the first user actions made by a first user using a first AR/VR device that displays the first AR/VR space to the first user;
translate the first user actions into first commands associated with at least one of multiple first visual objects in the first AR/VR space;
aggregate the first commands, associations of the first commands with the at least one first visual object, and a first AR/VR environment setup that defines the first visual objects presented in the first AR/VR space into at least one first record;
receive second data defining second user actions associated with a second augmented reality/virtual reality (AR/VR) space, the second user actions made by a second user using a second AR/VR device that displays the second AR/VR space to the second user;
translate the second user actions into second commands associated with at least one of multiple second visual objects in the second AR/VR space;
aggregate the second commands, associations of the second commands with the at least one second visual object, and a second AR/VR environment setup that defines the second visual objects presented in the second AR/VR space into at least one second record;
send instructions to the second AR/VR device to display a replica of the first AR/VR space to the second user using the second AR/VR device based on the at least one first record while also concurrently displaying the second AR/VR space to the second user using the second AR/VR device based on the at least one second record.

10. The apparatus of claim 9, wherein the first and second records have a portable file format.

11. The apparatus of claim 9, wherein the first data defining the first user actions comprises one or more of:
data defining one or more gestures made by a user;
data defining one or more voice commands or voice annotations spoken by the user;
data defining one or more textual messages provided by the user; and
data defining one or more pointing actions taken by the user using at least one pointing device.

12. The apparatus of claim 9, wherein, to translate the first user actions into the first commands, the at least one processing device is configured to use a grammar reference that associates different user input actions with different commands.

13. The apparatus of claim 9, wherein the at least one processing device is part of a server.

14. The apparatus of claim 9, wherein the at least one processing device is further configured to:
receive at least one third record containing third commands, associations of the third commands with the at least one third visual object, and a third AR/VR environment setup that defines the third visual objects presented in the third AR/VR space
send instructions to the second AR/VR device to display a replica of the third AR/VR space to the second user using the second AR/VR device based on the at least one third record while also concurrently displaying the second AR/VR space and the first AR/VR space to the second user using the second AR/VR device.

15. The apparatus of claim 9, wherein the second AR/VR device displays multiple replica views of multiple other users' AR/VR spaces.

16. A method comprising:
receiving, from a first user, a request to subscribe to a second user, wherein the second user is a trainer;
receiving, from the second user, one or more records containing commands, an association of the commands with at least one of multiple visual objects in an augmented reality/virtual reality (AR/VR) space, and an AR/VR environment setup that defines the visual objects presented in the AR/VR space;
publishing the one or more records to an AR/VR device of the first user; and
providing an overall visual environment to the first user via the AR/VR device of the first user that includes an AR/VR space associated with the AR/VR device of the first user as well as a replica of the AR/VR space associated with the second user so that the first user can learn by seeing what the trainer is doing in the AR/VR space associated with the second user.

17. The method of claim 16, further comprising:
receiving, from a third user, another request to subscribe to the second user;
wherein publishing the one or more records comprises publishing the one or more records to the AR/VR devices of the first and third users.

18. The method of claim 16, wherein the one or more records have a portable file format.

19. The method of claim 16, wherein publishing the one or more records comprises publishing the one or more records to the first user using a messaging service.

20. The method of claim 16, wherein publishing the one or more records comprises publishing the one or more records to the first user in real-time.

* * * * *